Figure 1:
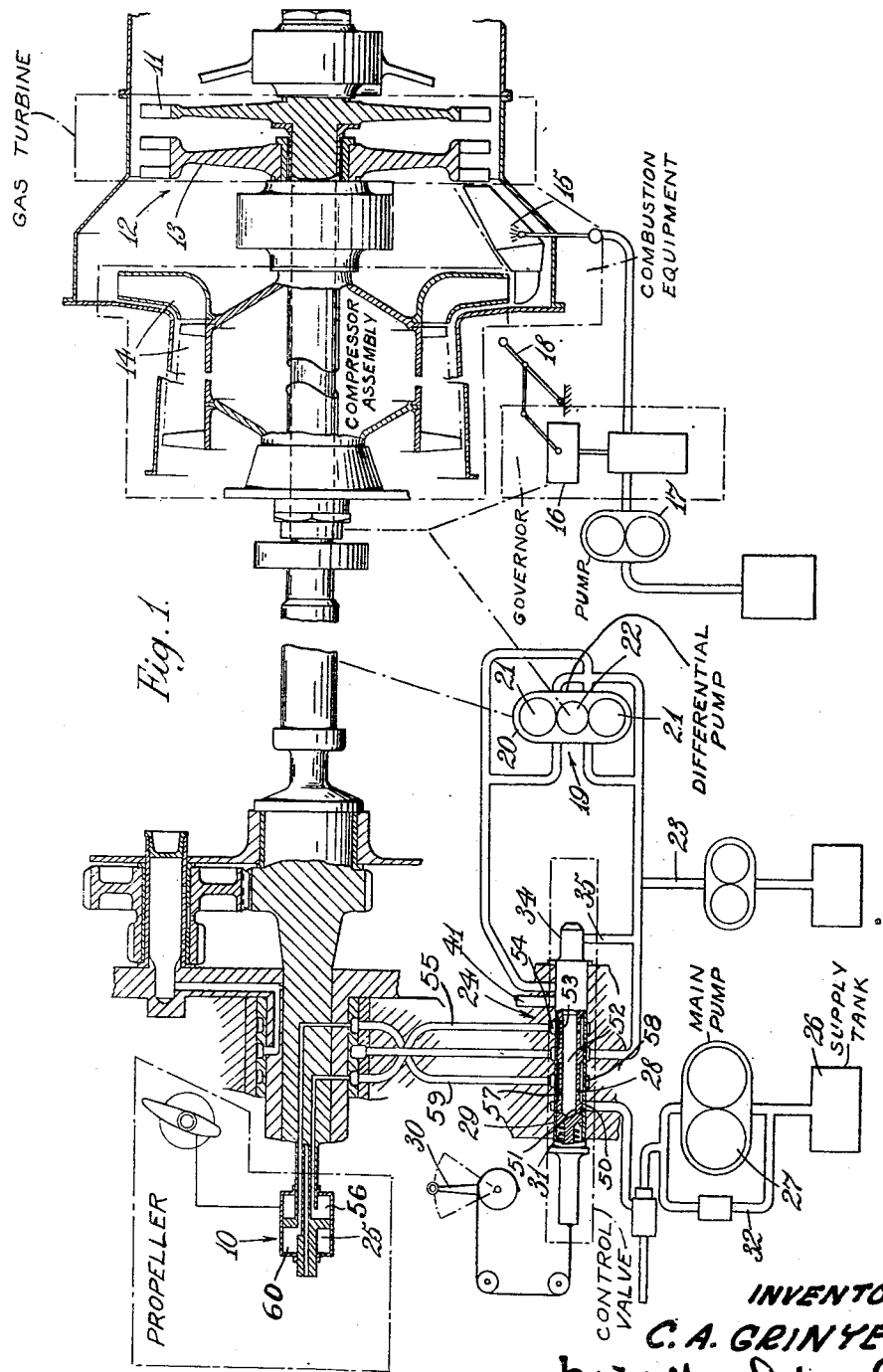

July 13, 1954

C. A. GRINYER 2,683,493

VALVE MEANS FOR CONTROLLING HYDRAULICALLY-OPERATED
PROPELLER PITCH CHANGE MECHANISM

Filed April 28, 1950

3 Sheets-Sheet 1

INVENTOR
C. A. GRINYER
by Wilkinson Mawhinney
Attys.

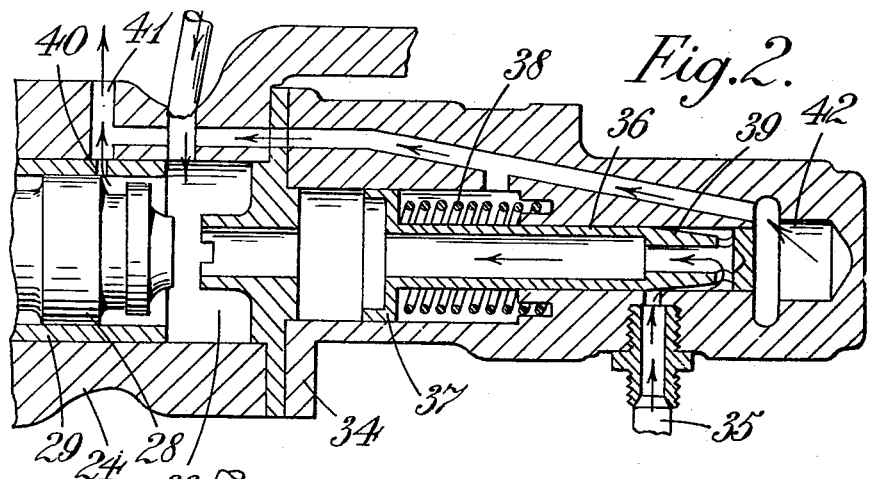
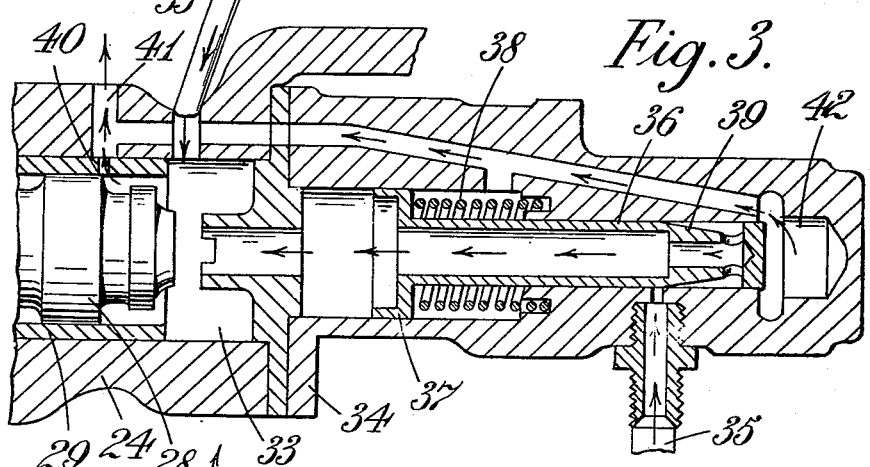
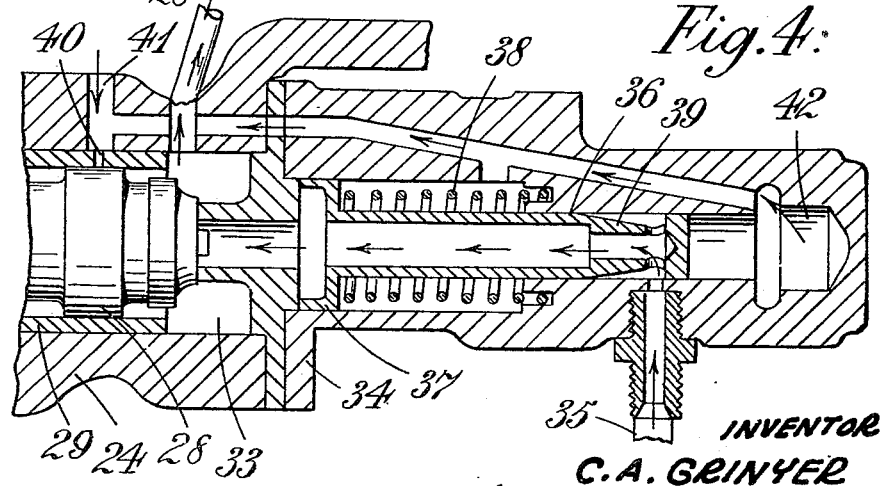

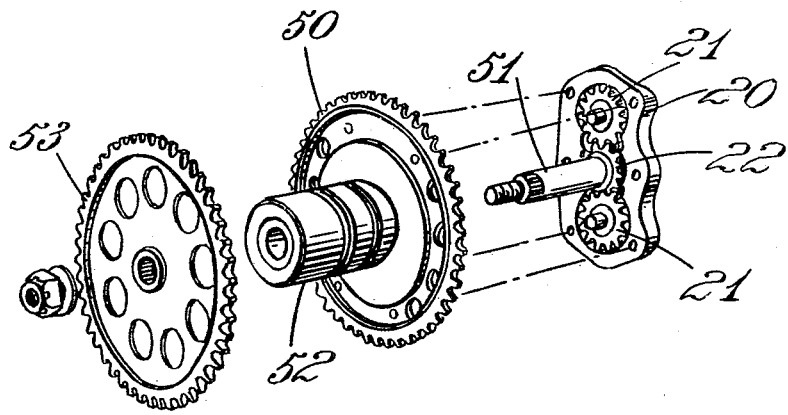

Patented July 13, 1954

2,683,493

UNITED STATES PATENT OFFICE 2,683,493

VALVE MEANS FOR CONTROLLING HYDRAULICALLY OPERATED PROPELLER PITCH CHANGE MECHANISM

Charles Albert Grinyer, Bristol, England, assignor to The Bristol Aeroplane Company Limited, Bristol, England, a British company Application April 28, 1950, Serial No. 158,714

Claims priority, application Great Britain May 4, 1949

13 Claims. (Cl. 170—135.72)

This invention concerns valves for controlling hydraulically-operated mechanisms of the type in which the valve is hydraulically moved under the control of a regulator to adjust the mechanism.

The present invention is more particularly concerned with a valve for controlling a hydraulically-operated, variable-pitch propeller in which the delivery of a pump assembly is applied to adjust the valve (when the pump is driven upon a difference in the propeller speed and a datum speed manifesting itself) and thereby change the pitch of the propeller blades.

The invention is further, though not exclusively, concerned with controlling a variable-pitch propeller which is driven by one rotor of a multi-stage gas turbine having independently rotating rotors so as to maintain a predetermined ratio between the speeds of the rotors.

In valves of the type set forth changes in the viscosity of the hydraulic fluid may lead to hunting in the control system. Thus, with changes in viscosity, violent fluctuations in propeller speed may be produced which if applied to the rotor of a multi-stage gas turbine having independently rotating rotors will result in the ratio between the speeds of the rotors being changed.

A further disadvantage is that when the hydraulic fluid has a high viscosity the valve will adjust the mechanism for relatively small and transient changes in the regulator e. g. due to small changes in propeller speed.

The present invention has for its object to minimise or eliminate the disadvantages referred to.

According to this invention a valve of the type set forth is characterised, firstly, in that the hydraulic operating fluid and a second fluid, the latter at a substantially constant pressure, flow through a chamber where they are both applied to adjust the valve, and secondly in that, while the regulator is ineffectual to adjust the valve, the rate of flow of operating fluid is relatively small compared with the rate of flow of the second fluid and, further in that the rate of flow of the second fluid is controlled by valve means to maintain a substantially constant pressure in said chamber. The regulator may be inoperative and thus incapable of adjusting the valve or it may be operative and without effect in adjusting the valve and both meanings are to be understood by the word "ineffectual."

According to a feature of this invention the control valve and said valve means (which is hereinafter referred to as the rate-of-flow valve) are both exposed to the pressure fluid in the chamber and both valves are spring-moved against the pressure, the arrangement being that changes in viscosity of the operating fluid produce pressure changes in the chamber which are applied to said valve means to adjust the quantity of the second fluid entering the chamber thereby to maintain a substantially constant pressure in said chamber.

According to another feature of the present invention the rate-of-flow valve is spring urged to open and is so arranged that on closing the control valve the rate of flow valve is adjusted to maintain the pressure in said chamber such that the control valve remains substantially stationary. In certain circumstances it may be necessary, or desirable to provide for a continuous small flow of hydraulic fluid around the system in which case the regulator will be operated to provide this. When so arranged the statement in the present specification that the regulator is inoperative then refers to its being adjusted to provide said small flow only.

In order that the nature of this invention may be better understood a practical application thereof will now be described, merely by way of example, with reference to the accompanying drawings whereof:

Figure 1 is a schematic layout of a hydraulic, variable-pitch propeller incorporating valve means in accordance with this invention, and Figure 2 is a sectional elevation showing, to a larger size, a part of the valve means of Figure 1 in the neutral position of the valve when the oil is at a relatively high temperature (e. g. 70° C.) and therefore has a low viscosity, Figure 3 is a view corresponding to Figure 2 and showing the position of the valve when the oil is at a relatively low temperature (e. g. 40° C.) and therefore has a high viscosity, and Figure 4 is a view corresponding to Figure 2 showing the position of the valve for the fine pitch position of the propeller blades, and Figure 5 is an exploded perspective view illustrating certain structural details of a pump which forms part of the apparatus in Figure 1.

Referring to the drawings, and more particularly to Figure 1 thereof: the hydraulically-operated, variable-pitch propeller 10 is driven by one rotor 11 of a two-stage gas turbine 12. The first-stage rotor 13 of the turbine 12 drives a compressor assembly 14 which delivers to combustion equipment 15. The combustion products pass from equipment 15 to the gas turbine and in succession through the first and second-stage rotors, which are independently driven. It is the second-stage rotor 11 which drives the variable-pitch propeller 10.

The speed of rotation of the rotor 13 (the compressor turbine) is controlled in any convenient or known manner by a governor 16 which regulates the quantity of fuel delivered by pump 17 to the combustion equipment 15. The datum position of the governor is adjustable by hand lever 18 to vary the speed of the compressor turbine to any desired value.

The speeds of the compressor and propeller turbines (i. e. the speeds of rotors 11, 13) are maintained in a given ratio by adjusting the pitch of the propeller 10 as hereinafter described.

A differential-pump assembly 19 is provided, as shown in Figure 5. The body 20 is bolted to a gear wheel 50 which is driven through a suitable train of gears (not shown) from the propeller turbine so that the body 20 is driven by said turbine. The gear element 22 is carried by the shaft 51 which extends through the boss 52 carrying the gear wheel 50 and itself carries in any known manner, a gear wheel 53 which is driven through a train of gears (not shown) from the compressor turbine so that the gear element 22 is driven by said turbine. Thus, the body 20, carrying gears 21 is driven by the propeller turbine and a gear element 22 is driven by the compressor turbine so that the pump output depends on the relative speeds at which body 20 and element 22 are driven. When they are driven at a selected speed the gears 21, 22 are relatively stationary and there is no pump delivery. Variations in the speed from said selected value will produce relative rotation of the gears 21, 22 in one sense or the other with corresponding delivery from the pump in one way or the other. It is arranged that when the speeds of the compressor and propeller turbines are at a selected ratio the pump gears are so driven that the pump idles at a speed only sufficient to overcome leakage in the pump.

In certain circumstances it may be necessary, or desirable, to provide for a continuous small flow of hydraulic fluid from the pump 19 to the regulator which adjusts the control valve of the hydraulic motor of propeller 10 in which case the gearing connecting the compressor and propeller turbines to the differential-pump assembly will be so designed as to ensure that when the turbines are at the selected speed ratio the pump 19 will deliver the required small flow.

The pump is arranged to draw pressure fluid from the lubricating system 23 of the gas turbine engine. The pump is also connected with a control valve 24 which regulates the passage of pressure fluid to and from the pitch-change motor 25 of propeller 10. Pressure fluid for actuating the pitch-change motor of the propeller is drawn from a supply tank 26 and delivered through the control valve 24 by a main pump 27 which is driven by the gas turbine engine in any convenient way.

The control valve 24 comprises a piston valve element 28 carried within a sleeve element 29. The sleeve element is axially adjustable by a manual control 30 to set the valve 24 to move the blades of propeller 10 towards a feathering position by permitting pressure fluid to pass from pump 27 through ports 50, 51, passage 52, ports 53, 54, pipe 55 and so to chamber 56 of motor 25 or to a reverse-pitch position by permitting pressure fluid to pass from pump 27 through port 50, passage 57, port 58, pipe 59 to chamber 60 of motor 25, but for normal constant speed conditions of the propeller the control 30 is central with valve 24 in its equilibrium position. The valve element 28 is urged by spring 31 to assume a position such that pressure fluid from pump 27 is delivered through ports 50, 51, passage 52, ports 53, 54 and pipe 55, to the pitch-change motor 25 to move the propeller blades towards coarse pitch. The delivery of the differential pump 19 is applied to one end of the valve element 28 (as hereinafter described in detail) to move the latter in opposition to, or in conjunction with, its spring. With the arrangement described, while the speeds of the compressor and propeller turbines 13 and 11 respectively are in the selected ratio the differential pump delivery is applied to the control valve 24 to hold the valve element 28 against spring 31 in its closed position. The output from the pump 27 is at such time not applied to the pitch-change motor. The main pump delivers to a closed circuit 32 communicating with its suction side. In the event that the speed ratio between the compressor and propeller turbines departs from the selected value, the differential pump will be driven at a speed either higher or lower than normal. As a consequence pressure fluid will be delivered to, or withdrawn from, the end of the valve element 28 of the control valve 24 to adjust the latter in one direction or the other thereby to allow the pressure fluid from the main pump 27 to pass to the pitch-change motor 25. The blades of the propeller will therefore be adjusted to increase or decrease the speed of rotation of the propeller turbine. When the speed of the propeller has been adjusted to re-establish the ratio of the speeds of the two turbines the differential pump will become effectively inoperative and the valve element 28 of the control valve 24 will be returned by its spring 31 to its closed position or against its spring to said position.

While the speed ratio between the turbines is maintained the differential pump is idling at a speed sufficient to overcome any leakage in the system. This leakage may be accidental or partly accidental and partly intentional but the total amount of this leakage will in any case be small.

With the arrangement described it has been found that the control valve 24 is sensitive to changes in temperature of the hydraulic fluid—more particularly to decreases in temperature. When the temperature of the hydraulic fluid falls, thereby to increase its viscosity, hunting of the propeller control system takes place. This is believed to be due to the control valve being adjusted by a relatively small flow of the hydraulic fluid since with such smaller flow the pressure on the valve element is considerably increased.

It has also been found that at low temperatures, due to the high viscosity of the hydraulic fluid the propeller control system becomes responsive to small and transient departures in speed from the selected speed ratio. This, together with the disadvantage referred to immediately above, aggravates the tendency to hunting.

According to the present invention the differential pump 19 is connected with a chamber 33 formed in a casing 34 at one end of the control valve 24 (see Figures 2, 3 and 4). The valve element 28 enters the casing and is therefore subjected to the pressure of the hydraulic fluid of the differential pump. The pressure of the lubrication system 23 of the gas turbine engine is also applied to the chamber by pipe 35 and it is arranged that the fluid delivered by the lubrication system is maintained at a constant pressure. The quantity of fluid entering the chamber 33 from the lubrication system 23 is regulated by a rate-of-flow valve 36 of the piston type. The head 37 of valve 36 is subjected on its left hand side (Figures 2, 3, 4) to the pressure in chamber 33 and the valve is urged by spring 38 into the chamber. To control the passage of fluid valve 36 is formed with a taper portion 39. The sleeve element 29 of the control valve 24 has a port 40 which communicates with drain passage 41 and the port places the chamber 33 in communication with said passage. The end 42 of the hole which accommodates valve 36 is connected with drain passage 41.

While the differential pump 19 is inoperative and either delivers or withdraws pressure fluid from the chamber only to create a leakage flow it is arranged that the rate of flow of hydraulic fluid through the chamber 33 from said pump is always small compared with the rate of flow of fluid from the lubrication system 23 therethrough. Thus, for a total flow of 25 gallons of oil per hour through chamber 33 the quantity delivered by the differential pump 19 is 5 gallons per hour. This may occur at a temperature of 70° C. when the oil has a relatively low viscosity. At 40° C. when the viscosity is higher, the total flow through chamber 33 may be 15 gallons per hour of which the quantity supplied by the differential pump 19 is 3 gallons per hour.

Let it be assumed that the speed of the propeller turbine 11 increases so that the selected speed ratio is departed from. As a consequence the differential pump 19 will deliver to chamber 33, increasing the pressure therein. The valve element 28 will then be moved against its spring 31 to allow pressure fluid from pump 27 to pass to the pitch-change motor 25 and adjust the blades of the propeller to a coarser pitch. The speed of the propeller turbine will thereby be reduced. Simultaneously with the adjustment of the valve element 28 the rate-of-flow valve 36 is moved against its spring 38 thereby reducing the quantity of fluid entering chamber 33 from pipe 35. The pressure therefore tends to fall thus enabling valve element 28 to be returned to its closed, sensitive position to cut off pump 27 from motor 25 and stop the blade-adjusting operation. The control valve 24, the rate-of-flow valve 36 and their associated springs 31 and 38 are so arranged that a complete cycle of operations in adjusting the pitch of the blades of the propeller takes place before the differential pump 19 and the control valve 24 are restored to their normal positions. In this way hunting of the system is avoided.

Similarly, when the speed of the propeller turbine 11 falls the differential pump 19 is adjusted to withdraw hydraulic fluid from chamber 33 so that the pressure therein falls whereby the valve element 28 is moved by spring 31 to allow pressure fluid from pump 27 to pass to the pitch-change motor 25 and thereby set the blades of the propeller 10 to a finer pitch. This will re-establish the speed ratio between the compressor and propeller turbines. When the pressure in chamber 33 falls the rate-of-flow valve 36 will open and the quantity of constant-pressure fluid passing the valve will be increased. The effect is as indicated above, namely, to adjust the propeller blades to re-establish the speed ratio before normal conditions are re-established in the chamber by the constant-pressure fluid.

While the valve 24 remains closed, or in its sensitive position, the pressure in chamber 33 is maintained substantially constant when alterations in temperature bring about viscosity changes in the oil delivered to chamber 34 by pump 19. In the event of such a change in viscosity the pressure in chamber 33 will alter correspondingly and valve 36 will be adjusted to vary the quantity of oil entering chamber 33 from pipe 35 whereby the pressure change due to the viscosity is counterbalanced. In this way the pressure effect of a change in viscosity is corrected. However, before this is done the effect of the viscosity change is minimised since it is arranged that at all times the quantity of oil entering chamber 33 from pump 19 is small compared with the quantity from pipe 35 and that the pressure of lubricating oil from pipe 35 is relatively considerable—say, 80 lbs. per sq. in.

The effect of a change in viscosity is illustrated in Figures 2 and 3. In Figure 2 the oil in pipe 35 is at 80 lbs. per sq. in., the oil from pump 19 enters the chamber 33 at 5 gallons per hour and the reducing valve 36 controls the flow of oil from pipe 35 into chamber 33 to 20 gallons per hour. When the viscosity of oil from pump 19 increases (for example, with a fall in temperature from 70° C.—the conditions prevailing for Figure 2—to 40° C.) the quantity delivered by pump 19 is reduced to 3 gallons per hour but this delivery occurs at a higher pressure due to the increased viscosity and consequently the corresponding change of pressure in chamber 33 sets valve 36 to reduce the rate of flow of lubricating oil through the chamber to 12 gallons per hour (Figure 3). In both cases (Figures 2 and 3) the pressure in chamber 33 is maintained at about 20 lbs. per sq. in.

In the event that the speed of the propeller turbine is seriously reduced the differential pump will operate to reduce the pressure in chamber 33 to such a low value that the rate-of-flow valve 36 moves completely within the chamber (see Figure 4). The valve element 28 of the control valve will be similarly moved and the oil from pipe 35 passes through the rate-of-flow valve 36 into chamber 33 and thence to pump 19 since port 41 is shut by element 28. It will be appreciated that this condition will be reached only as a consequence of a large and sudden fall in speed of the propeller turbine. The effect is that the propeller blades are quickly brought to their fine-pitch position.

Although the invention has been described with reference to a control for a variable pitch propeller, it will be appreciated that the invention is not so limited. The invention has general application where a control valve is hydraulically actuated and where the temperature conditions are such as to vary the viscosity of the hydraulic fluid to produce hunting. Furthermore although the invention has been described with reference to a control for a variable pitch propeller which is driven by an engine having a two-stage gas turbine, it will be understood that the invention may also be applied to a gas turbine having a single rotor which is required to be maintained at a selected speed relatively to a datum.

I claim:

1. Control means for hydraulically operated mechanisms of the type set forth comprising a chamber through which a hydraulic operating fluid and a second fluid at a substantially constant pressure are directed to flow, a control valve reciprocable in the chamber for controlling the passage of the said operating fluid to the mechanism moveable in response to changes in the fluid pressure in one end of the chamber, spring means acting on said control valve in opposition to the fluid pressure in the end of the chamber, valve means communicating with the chamber and exposed to the fluid pressure and reactive thereto to control the quantity of the second fluid entering the chamber in response to changes in the fluid pressure therein and spring means associated with said valve means and acting in opposition to the pressure in said chamber.

2. A control means as claimed in claim 1 in which said spring means for the valve means is provided for urging the valve means to an open position and said valve means is arranged so that on closing the control valve the valve means is adjusted to maintain the pressure in said chamber to cause the control valve to remain substantially stationary.

3. A control means as claimed in claim 1 in which the valve means includes a rate of flow valve which comprises a taper valve, a housing for said valve communicating with the chamber and having an axial passage within which the said valve is slidably mounted and being formed with a lateral port with which the taper valve cooperates, said port providing the means for the entrance of the second fluid into the chamber.

4. A control means as claimed in claim 1, in which the valve means includes a rate of flow valve that is slidably mounted in a valve body communicating with the chamber and is formed with a longitudinally extending bore closed at one end and opening at the other end into the chamber, said valve and valve body being formed with registerable ports through which the second fluid enters the chamber.

5. A control means as claimed in claim 1, wherein the chamber is formed with a drain passage through which the operating and second fluids escape from the chamber, said passage being controlled by the control valve.

6. A control means as claimed in claim 1, wherein pump means is provided for delivering the operating fluid to the chamber, the output of said pump being substantially proportional to the speed of the hydraulic mechanism which is controlled.

7. A control means as claimed in claim 6, in which the output of the pump means is directly proportional to the departure in speed of the hydraulic mechanism from a selected datum operating speed of the mechanism.

8. Control means as claimed in claim 1, wherein the control valve comprises a piston element, a sleeve within which the piston element is slidably mounted and a valve body within which the sleeve is mounted, the sleeve and body having cooperating ports which cooperate with the piston element, the latter being adjusted by the fluid pressure in said one end of the chamber and manually controlled means connected to the sleeve for adjusting it.

9. In combination with a variable pitch propeller, an engine driving the propeller and a hydraulic mechanism for varying the pitch of the propeller, a valve assembly for controlling the mechanism comprising a chamber through which the hydraulic operating fluid and a second fluid at a substantially constant pressure flow, a control valve, reactive to the fluid pressure in the chamber from the operating fluid and the second fluid for controlling the flow of the hydraulic operating fluid through the chamber in response to changes in the pressure in the chamber, and having a portion exposed to the chamber and the fluid pressure therein, spring means urging said control valve against the fluid in the chamber, valve means controlling the rate of flow in the second fluid in opposition to changes in the pressure in the chamber and spring means holding said valve means in opposition to the fluid pressure.

10. The combination of claim 9, wherein said hydraulic mechanism is driven by one of a pair of members whose speed is to be regulated in a selected ratio and the control valve is provided to regulate the speed of the hydraulic mechanism thereby to maintain said ratio.

11. The combination of claim 10, wherein said engine is a gas turbine engine and said pair of members comprise independently rotating rotors of the engine, one of the rotors driving the compressor of the engine and the other rotor driving the propellor.

12. The combination of claim 9, wherein the second fluid is obtained from the lubricating system of the engine.

13. The combination of claim 9, wherein a pump is provided for delivering the operating fluid to the chamber, the output of the pump being substantially proportional to the departure in speed of the hydraulic mechanism from a selected datum operating speed of the mechanism.

References Cited in the file of this patent

UNITED STATES PATENTS

| Number | Name | Date |
|---|---|---|
| 1,893,612 | Caldwell | Jan. 10, 1933 |
| 2,216,416 | Mader | Oct. 1, 1940 |
| 2,334,967 | Thomas et al. | Nov. 23, 1943 |

FOREIGN PATENTS

| Number | Country | Date |
|---|---|---|
| 162,999 | Great Britain | May 12, 1921 |
| 475,329 | Great Britain | Nov. 17, 1937 |
| 586,558 | Great Britain | Jan. 10, 1942 |